United States Patent
Malville et al.

[11] Patent Number: 5,222,107
[45] Date of Patent: Jun. 22, 1993

[54] TRANSMISSION AND RECEPTION SYNCHRONIZATION DEVICE FOR A COMMUNICATION NETWORK STATION PARTICULARLY FOR AUTOMOTIVE VEHICLES

[75] Inventors: Joël Malville, Chambly; Patrick Herbault; Bruno Abou, both of Paris, all of France

[73] Assignees: Automobiles Peugeot, Paris; Automobiles Citroen, Neuilly/Seine, both of France

[21] Appl. No.: 447,404

[22] Filed: Dec. 7, 1989

[30] Foreign Application Priority Data
Dec. 7, 1988 [FR] France .................... 88 16087

[51] Int. Cl.$^5$ ............................................. H04L 27/22
[52] U.S. Cl. .................................... 375/107; 328/108
[58] Field of Search ................ 375/107, 110, 87, 118; 370/105.3, 105.2, 110.3, 103, 104.1; 328/55, 63, 72, 108; 307/517, 352; 360/51; 340/825.2, 825.14, 825.08

[56] References Cited
U.S. PATENT DOCUMENTS

| | | | |
|---|---|---|---|
| 3,350,644 | 10/1967 | McNair | 375/107 |
| 4,253,181 | 2/1981 | Watten | 375/107 X |
| 4,567,604 | 1/1986 | Jacksier | 375/87 |
| 4,696,016 | 9/1987 | Rozema et al. | 375/110 X |

FOREIGN PATENT DOCUMENTS
2015308 9/1979 United Kingdom .

OTHER PUBLICATIONS
Elektronik, vol. 27, No. 1, Feb. 1978, pp. 52–56, W. Beifus.

Primary Examiner—Curtis Kuntz
Assistant Examiner—Tesfaldet Bocure
Attorney, Agent, or Firm—Burns, Doane, Swecker & Mathis

[57] ABSTRACT

This device includes a signal processor (30,35,36,37,38,47,49) to generate sampling signals of information present on a network, and a selection circuit (43) for loading the signal processor with at least one synchronization value (44, 45) corresponding to at least one propagation time for information in the network to synchronize the station according to the transmission characteristics of the network.

3 Claims, 5 Drawing Sheets

TRANSMISSION AND RECEPTION SYNCHRONIZATION DEVICE FOR A COMMUNICATION NETWORK STATION PARTICULARLY FOR AUTOMOTIVE VEHICLES

BACKGROUND OF THE INVENTION

1. Field of the Invention

The present invention relates to a transmission and reception synchronisation device for a communication network station in particular for automotive vehicles.

2. Description of Related Art

In a communication network, when different stations are interconnected, they carry out communication operations locally, according to their own local clock.

These local clocks provide time references to interpret communication frames in reception and to generate communication frames in transmission.

Thus, in transmission, a transmitting station generates data at the rate of its local clock in the form of an encoded signal.

In order to facilitate the interpretation of data frames, the encoding of the signal can contain in each bit, the clock information and, for example, encoding by pulse width or biphase encoding, and variants thereof can then be used.

Other techniques do not produce, as regards these, time references at each bit. In particular NRZ (Non return to Zero) encoding directly reproduces the data. Only the data transitions allow the clock transitions of the transmitting station to be determined.

Nevertheless different problems present themselves.

In effect, depending upon the type of oscillator used locally for each station, the latter do not have the same local clock frequency for the generation and analysis of the data frames.

Furthermore, taking into account the fact that several stations are capable of transmitting simultaneously on a network, it is necessary to manage the problems of possible conflict. Also, each station is obliged always to compare the bit that it transmits with the bit present on the network.

For physical reasons linked to the information transmission lines, to the number of stations connected to these, to the characteristics of the transmission-reception circuits of the lines, etc . . . different delays according to the type of transmitted edges namely rising or falling edges, are introduced at the time of transmission. It is known that these delays create problems at the time of analysing the signals.

SUMMARY AND OBJECTS OF THE INVENTION

The object of the invention is then to resolve these problems by proposing a synchronization device for a communication network station which may be simple, reliable and which permits the carrying out of a correct treatment of data, said treatment integrating the physical realities of the network.

To this end, the invention has as its subject a transmission and reception synchronization device for a communication network station in particular for an automotive vehicle, of a kind comprising means to generate sampling signals of information present on the network, characterized in that it comprises means for loading the generating means with at least one synchronization value corresponding to at least one propagation time for information in the network to synchronise the station according to the transmission characteristics of the network.

According to one embodiment, the loading means comprise means for selecting one or other of two synchronization values according to the type of information edge present on the network, the synchronization values one of which corresponds to the propagation time of a rising edge of information in the network and the other, to the propagation time of a falling edge.

According to another embodiment, the synchronization value corresponds to the average propagation time of rising and falling edges in the network.

BRIEF DESCRIPTION OF THE DRAWINGS

The invention will be better understood with the aid of the following description, given solely as an example and referring to the attached drawings in which.

DESCRIPTION OF THE PREFERRED EMBODIMENTS

Figure 1:
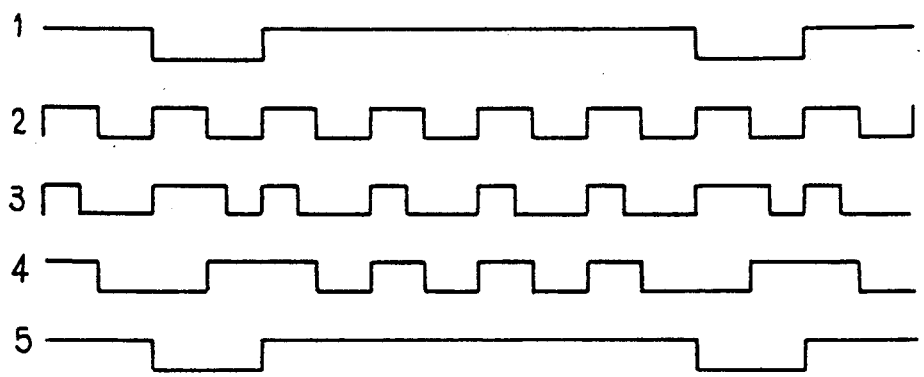
FIG. 1 represents a number of signals illustrating the operation of a communication network station in transmission.

As can be seen in FIG. 1, different stations interconnected on the communication network carry out local communication operations from their own local clock. These clocks provide time references to interpret in reception and generate in transmission communication frames.

Thus, for example, in transmission a transmitting station generates data 1 at the rate of its local clock 2 in the form of an encoded signal. To facilitate the interpretation of this frame the encoding of the signal can contain, in each bit, the clock information by using for example pulse width encoding 3, biphase encoding 4 and variants thereof.

Furthermore, there equally exist other techniques which do not provide time reference with each bit. In effect, this is the case particularly with NRZ (Non return to Zero) encoding illustrated by signal 5 in FIG. 1.

Only the data transitions then allow the determination of the clock transitions of the transmitting station.

According to the type of oscillator used, in particular for each station, whether it be a quartz oscillator, a ceramic resonator or an oscillator of a resistor-capacitor type, the aforementioned do not have the same local clock frequency for the generation and analysis of the data frames.

Nevertheless it is possible to put forward the hypothesis according to which although a clock may be imprecise, it remains stable during the time interval of one data frame.

Furthermore, allowing for the fact that several stations are capable of transmitting simultaneously on the network, it is necessary to manage the problems of possible conflict.

Also each station is obliged always to compare the bits that it transmits with the bit present on the network. For physical reasons in connection with the lines of communication, the number of stations connected to these, the characteristics of the transmitter-receiver line circuits etc... different delays R according to the type of transmitted edge, namely rising or falling edge, are introduced as can be seen on FIG. 2, between the transmission and reception of data.

Figure 2:
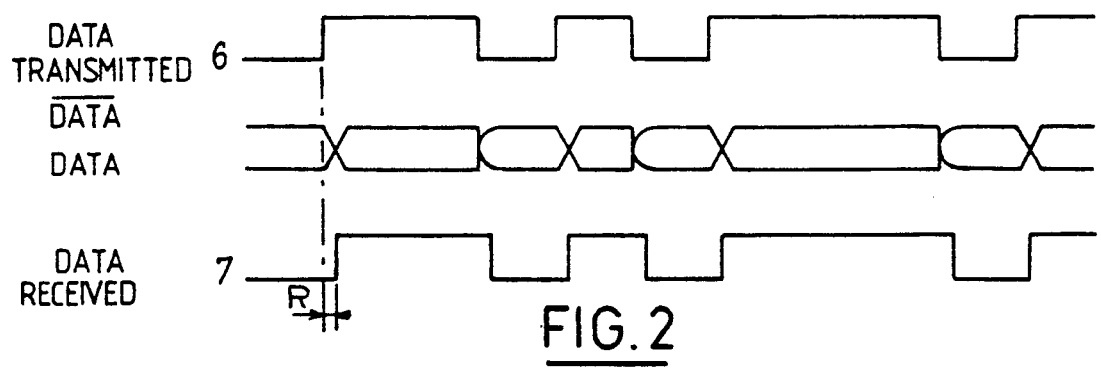
FIGS. 2 and 3 illustrate the delays introduced at the time of transmission.
Figure 3:
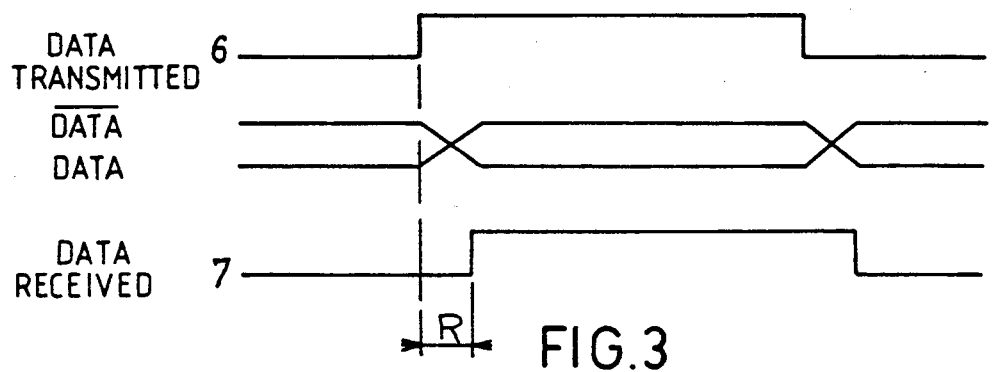

FIG. 3 shows an enlargement of one part of the signals represented in FIG. 2 and it can therefore easily be seen that between the data transmitted 6 and the data received 7, there is a delay R. The signals data and data shown between signals 6 and 7 are the signals really present on the transmission lines and their complement.

In the description that follows, a type of NRZ encoding is going to be used, it being understood that other types of encoding can also equally be used.

For this type of NRZ encoding, each station is obliged to sample the bit present on the network, for example at three quarters of its duration; this value can be different for other types of encoding.

The transmitting station must take account of the transmission delays of bits at the time of sampling.

The calibration of a transmitted bit is effected with the aid of a counter incremented by a local station clock and the sampling of a received bit is effected in the same manner. In practice, these two tasks are generally carried out by the same counter.

In the description that follows, the typical duration of a bit equals to 16 time units is considered.

Figure 4:
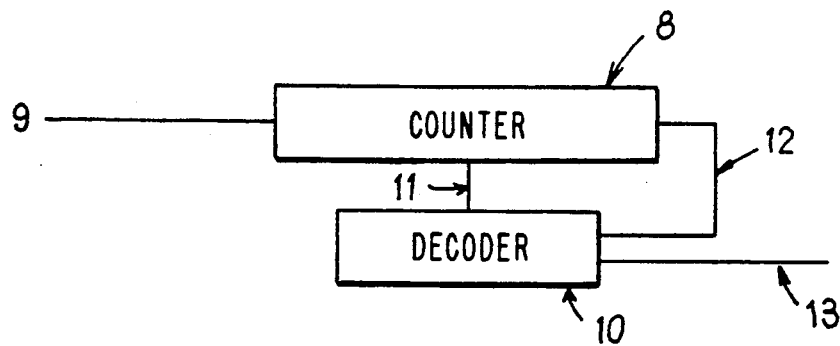
FIGS. 4 and 5 represent the means of generation of sampling signals, of the prior art.
Figure 5:
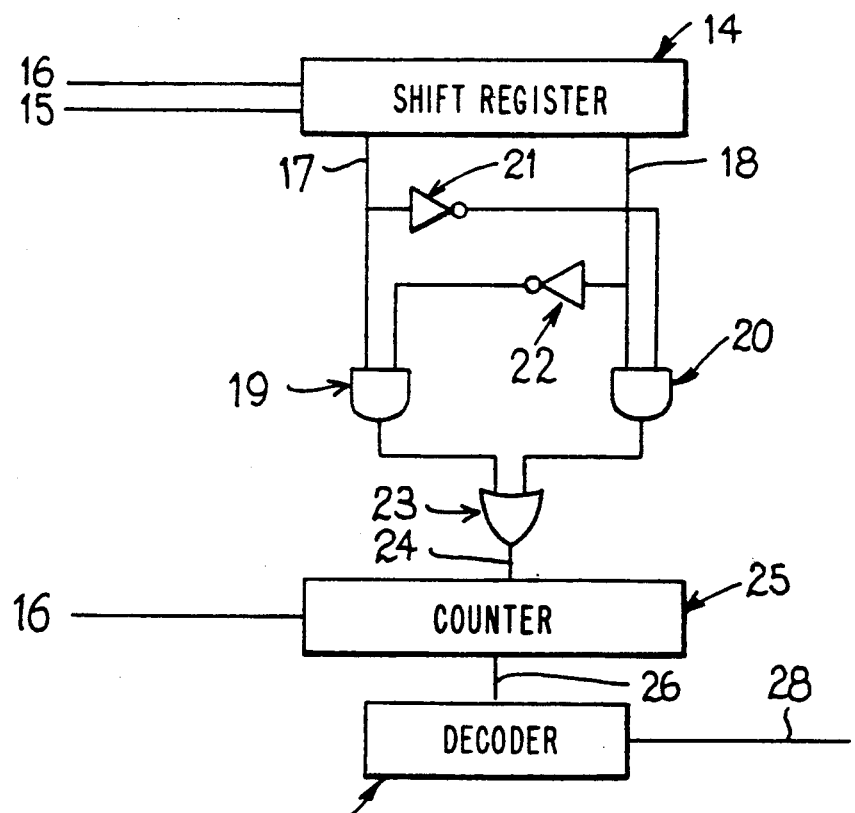

In FIGS. 4 and 5 the means for generating station synchronisation signals of the prior art are shown.

In FIG. 4, when the station is transmitting, a counter 8 of a type modulo 16 is incremented by a station local clock 9. A decoder 10 connected to the outputs 11 of this counter 8 decodes these outputs in order to generate a reinitialization signal 12 for the counter and a pulse 13 to sample the bit present on the network, for example, at three quarters of its duration in the example described, in order to detect a possible conflict with a bit transmitted simultaneously by another station connected to this network.

In FIG. 5, when the station is receiving, a shift register 14 receives a data signal 15 present on the network and shifts this data at the rate of a station local clock 16, to its outputs 17 and 18. The output 17 of the shift register 14 is connected to the input of an AND gate 19, whilst the output 18 is connected to the input of an AND gate 20.

The output 17 of the shift register 14 is also connected through an inverter 21 to another input to the AND gate 20, whilst the output 18 of the shift register 14 is also connected through inverter 22 to another input of the AND gate 19.

The outputs of AND gates 19 and 20 are connected to the input of an OR gate 23, in such a manner as to generate a reinitialization signal 24 for a counter 25, in synchronism with the rising and falling edges of the data signal 15 with an accuracy of one period of the local clock 16, also connected to this counter 25.

The outputs 26 of this counter are connected to a decoder 27 so that the latter generates at its output, i.e. at 28, a pulse for sampling the bit present on the network.

Figure 6:
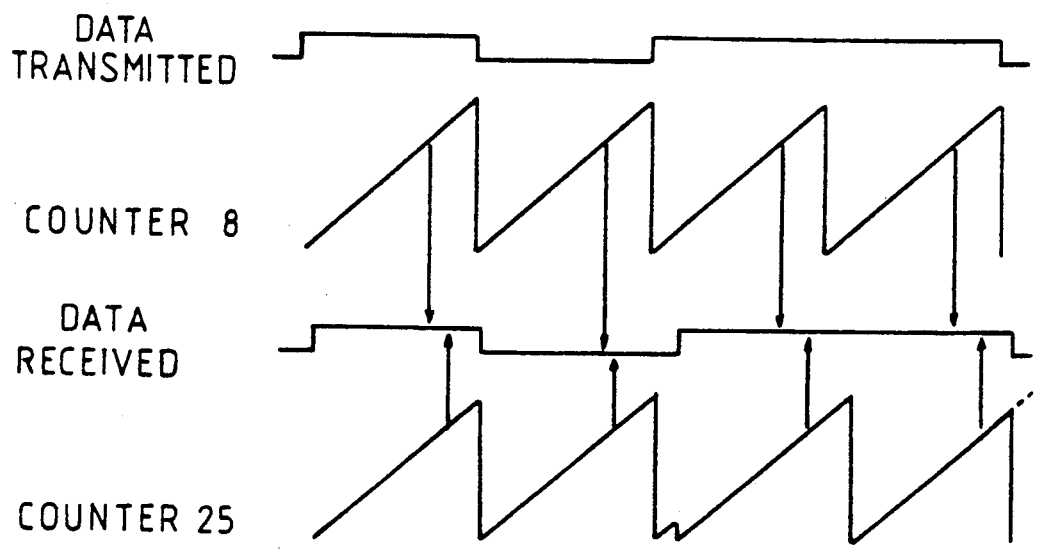
FIG. 6 represents different signals illustrating the operation of the means described in FIGS. 4 and 5.

The different signals illustrating the operation of the means represented in FIGS. 4 and 5, are shown in FIG. 6. It can be seen from this figure that there is a significant inaccuracy of the sampling point of the data present on the network, on the one hand for the transmitting station, which does not analyze the problem of conflict in good conditions, and on the other hand for the receiving stations which never sample the data present on the network at the same instant, which can lead to unjustified transmission errors.

Furthermore, the sampling points of the transmitting station are different to those of the receiving station.

Figure 7:
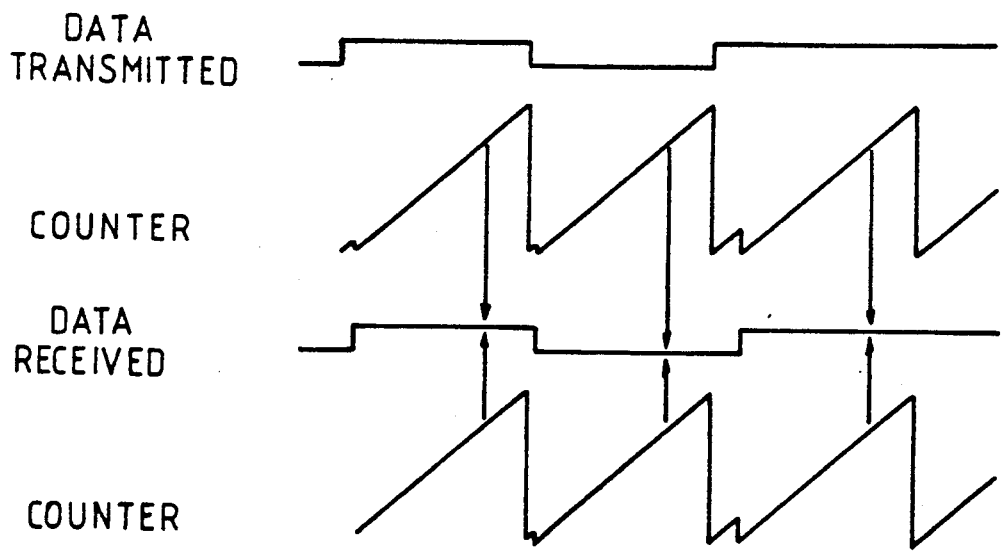
FIG. 7 represents different signals illustrating the operation of a second embodiment of the means of generation of sampling signals of the prior art.

In FIG. 7 there are shown signals illustrating the operation of a second embodiment of the generating means of the prior art. The operating principle for the transmission of a bit is identical to that described with reference to FIGS. 4 and 6, except for the resynchronization of the counter by the reinitialization signal at each transition of the data present on the network.

The operation of the receiver is in all ways identical to that used for the transmission.

In this case, an inaccuracy is noted of less importance than in the previous embodiment, of the sampling point of the data present on the network for the transmitting station.

All the samplings on the bus follow the same rule whether the state of known stations is transmission or reception.

In counter part, the bit rate on the network is no more constant than it is in the case of the embodiment described with reference to FIGS. 4, 5 and 6, for the transmitting station does not take account of the propagation delays at the time of generating the bits.

Figure 8:
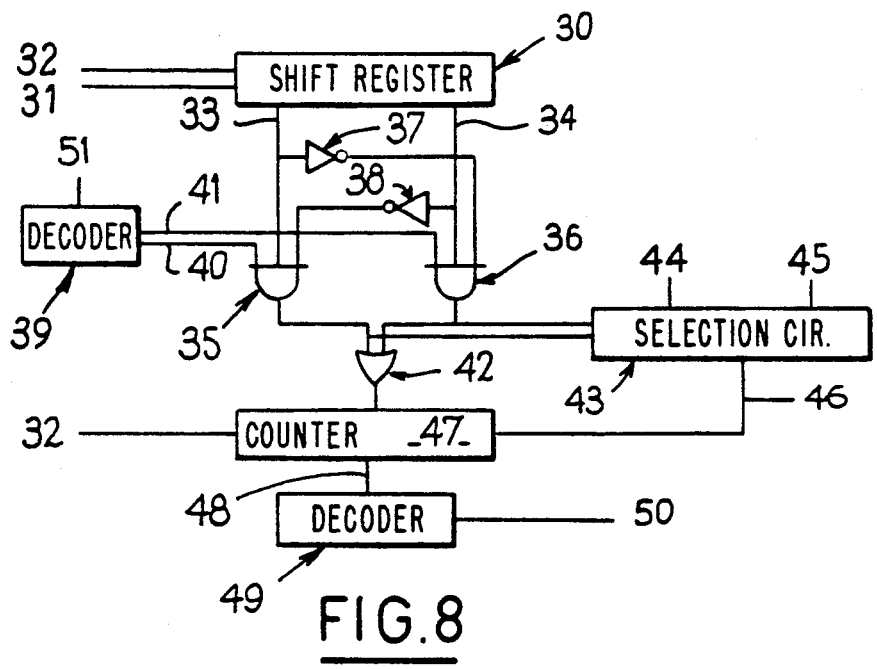
FIG. 8 represents a synchronization device according to the invention.

The device according to the invention represented in FIG. 8 allows the resynchronization of stations according to the data present on the network taking into account the frequency spread of the clock and the propagation times of the data in the network, for the generation and analysis of the frames.

Thus, a shift register 30 receives a data signal 31 present on the network and shifts it at the rate of the station local clock 32 to its outputs 33 and 34.

The output 33 of this shift register 30 is connected to the input of an AND gate 35 and to an input of an AND gate 36 through an inverter 37. The output 34 of the shift register 30 is connected to another input of an AND gate 36 and to another input of AND gate 35 through an inverter 38. A decoder 39, whose operation will be described in more detail subsequently, also has two outputs 40 and 41 connected respectively to a third input of AND gates 35 and 36. The input of this decoder 39 receives a driving signal which, as will be seen subsequently, is fixed, for example by the manufacturer of the automotive vehicle.

The outputs of AND gates 35 and 36 are connected to the inputs of an OR gate 42, and also to the inputs of a selection circuit 43, the operation of which will be described in more detail subsequently, and which receives on its inputs signals 44 and 45 representing the synchronization values corresponding to the propagation times relative to the rising or falling edges of the information in the network.

The output 46 of this selection means is connected to an input of a counter 47 also receiving on its inputs the output signal of gate 42 and the local clock signal 32.

The signals coming from gates 35 and 36 and connected to the selection circuit 43 are used for the selection of one of two values 44 or 45, which then constitutes the reinitialization value of the modulo 16 counter 47.

Thus, as has been mentioned previously, these values 44 and 45 correspond to the average values of the propagation times relative to the rising or falling edges of the data signal in the network, these values being determined, for example, by trail and stored in a memory of the station.

The output signal of gate 42 actuates the loading input of the counter 47 in synchronism with the data signal edges 31, the outputs 48 of this counter 47 being connected to the decoding circuit 49 which decode these outputs with the object of generating a pulse 50 for sampling the bit present on the network.

The output 46 of the selector 43 delivers a loading value which shifts the starting point of the counter 47 and which therefore allows account to be taken of the propagation times of the edges on the network.

It is understood that in this way the counter 47 is resynchronized by the data signal present on the network by taking into account the average propagation times associated with the transmitted edges, the values 44 and 45 being determined as previously explained.

Figure 9:
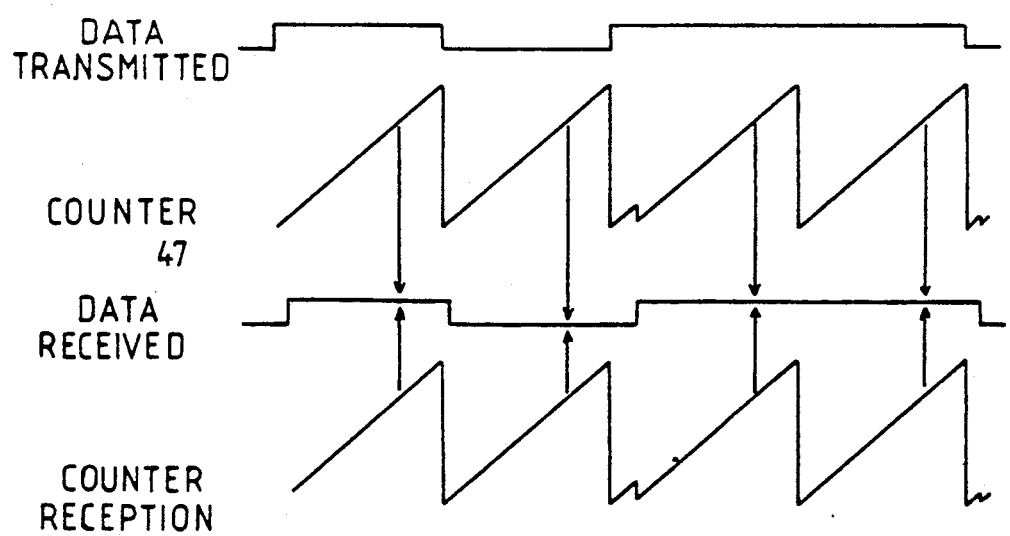
FIG. 9 represents different signals illustrating the operation of the device according to the invention represented in FIG. 8.

The different signals described above are represented in FIG. 9 where it can be seen that the sampling is produced at the same instant.

Depending on the type of application, it can be necessary to use only for the resynchronization a single type of edge at a given moment of execution. This selection of useful edges is achieved by means of signals 40 and 41 coming from the decoder 39, described with reference to FIG. 8, this decoder 39 itself receiving a set-point signal 51 that comes, for example, from the rest of the circuits of the vehicle station, this selection operating by preselection by the manufacturer of the vehicle.

Figure 10:
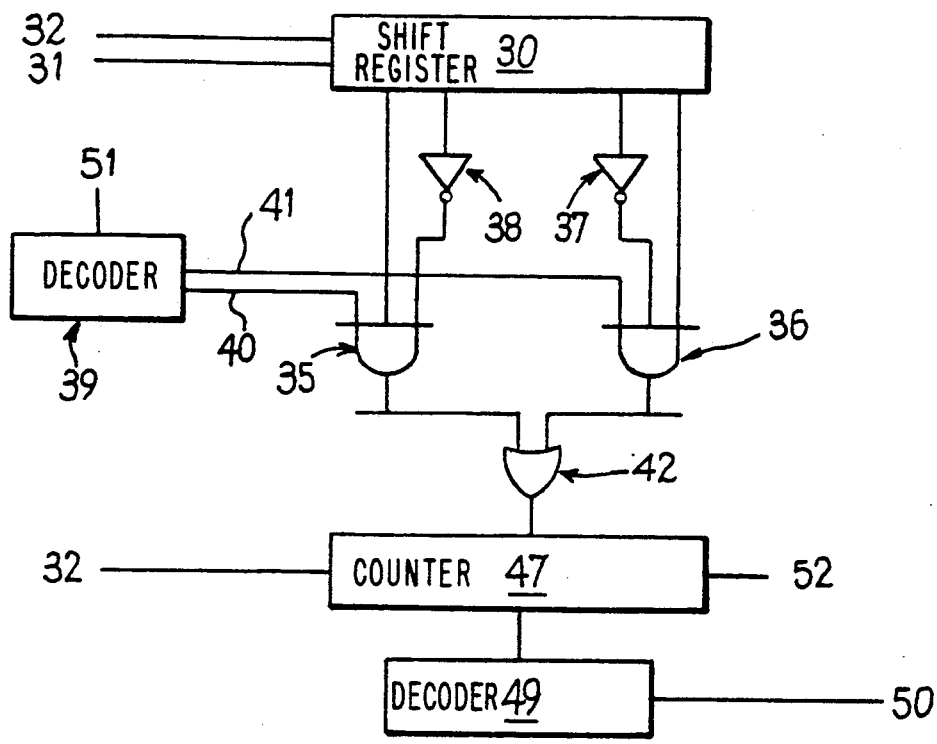
FIG. 10 represents a second embodiment of the device according to the invention.

It is also to be noted that the choice of the two preloading values of the counter 47 as it is described in FIG. 8, by the selection circuit 43, can be replaced by the loading of an average value 52 (FIG. 10) common to the two types of edges to be treated.

The output pulses of gates 35 and 36 are combined with the aid of OR gate 42 to constitute a loading signal of the average value 52 in the counter 19.

This value 52, being common to both types of edges, requires the selection of appropriate outputs of the shift register 30 for the generation of output pulses of gates 35 and 36 in order to ensure treatment of a data signal similar to that described previously.

When the propagation time of an edge is less than the average delay associated with it or possibly zero, the internal counters at the stations are resynchronized before having completed the current cycle, necessitating the reaching of the maximum counting value.

This phenomenon, if the minimum delay can effectively be negligible, is due to the tolerances of the local clock.

The solution employed to overcome these problems is the allocation of a systematic delay to the received data before any treatment thereof, which allows the resolution of problems of clock tolerances and of a loading not adapted to the propagation times of the data signals. This shift is easily obtained by the appropriate choice of shift register 30 outputs for the generation of pulses relative to the data signal edges.

The fault common to the different principles described previously is the total absence of data treatment during, on average, two clock periods after their appearance.

Figure 11:
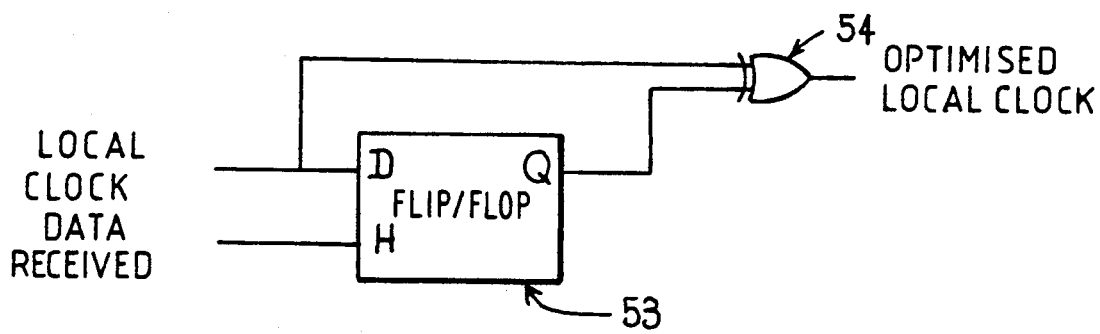
FIG. 11 represents a circuit for optimizing the local clock of a station entering into the structure of a device according to the invention.

This defect can be minimized by the utilization of the circuit shown in FIG. 11, in which D-type flip 53 receives on its inputs, on the one hand the data signal received and on the other the local clock signal, this local clock signal as well as the output of the flip flop 53 being connected to the inputs of an OR-EXCLUSIVE gate 54 of which the output forms an optimized local clock.

The resynchronization of the counter by the loading of the average value associated with the propagation of the signal edges present on the line therefore allows the execution of an appropriate data treatment, integrating the physical realities of the network.

In fixing the delay at a predetermined average value, a transmitting station can perfectly auto-synchronize without slowing down the bit rate in the network.

This resynchronization also has a large tolerance regarding time and system interfacing with the bus, the performances of which are slightly raised, for the resynchronization signal can appear between the transmission points and the sampling point which here is fixed at three quarters of the duration of a bit, this delay being compensated for by the loading of the counter.

Finally, this resynchronization is totally independent of the transmitting or receiving state of the station, so that consequently all the samplings on the bus follow the same rule.

We claim:

1. A transmission and reception synchronization device for stations of a communication network accessed by the stations according to be a bit-by-bit arbitration method, each station including:
    input means for inputting information from a network to said communication network station;
    means for generating sampling signals of information on the network; and
    means for loading the generating means with at least one synchronization value corresponding to at least one propagation time on the network to synchronize the station according to the transmission characteristics of the network by shifting the sampling signals of the generating means, said synchronization value corresponding to the propagation time for a rising edge, a falling edge or the average propagation time for the rising or falling edges of said information on the network.

2. A device according to claim 1, wherein said loading means includes selection means for selecting one of two synchronization values according to whether the information present on the network has said rising information edge or said falling information edge, wherein a first of the synchronization values corresponds to the propagation time for a rising information edge on the network and a second of the synchronization values corresponds to the propagation time of a falling information edge on the network.

3. A device according to claim 1, wherein said loading means includes means for selecting one of said rising information edge and said falling information edge used for the synchronization.

* * * * *